Figures 1, 2:
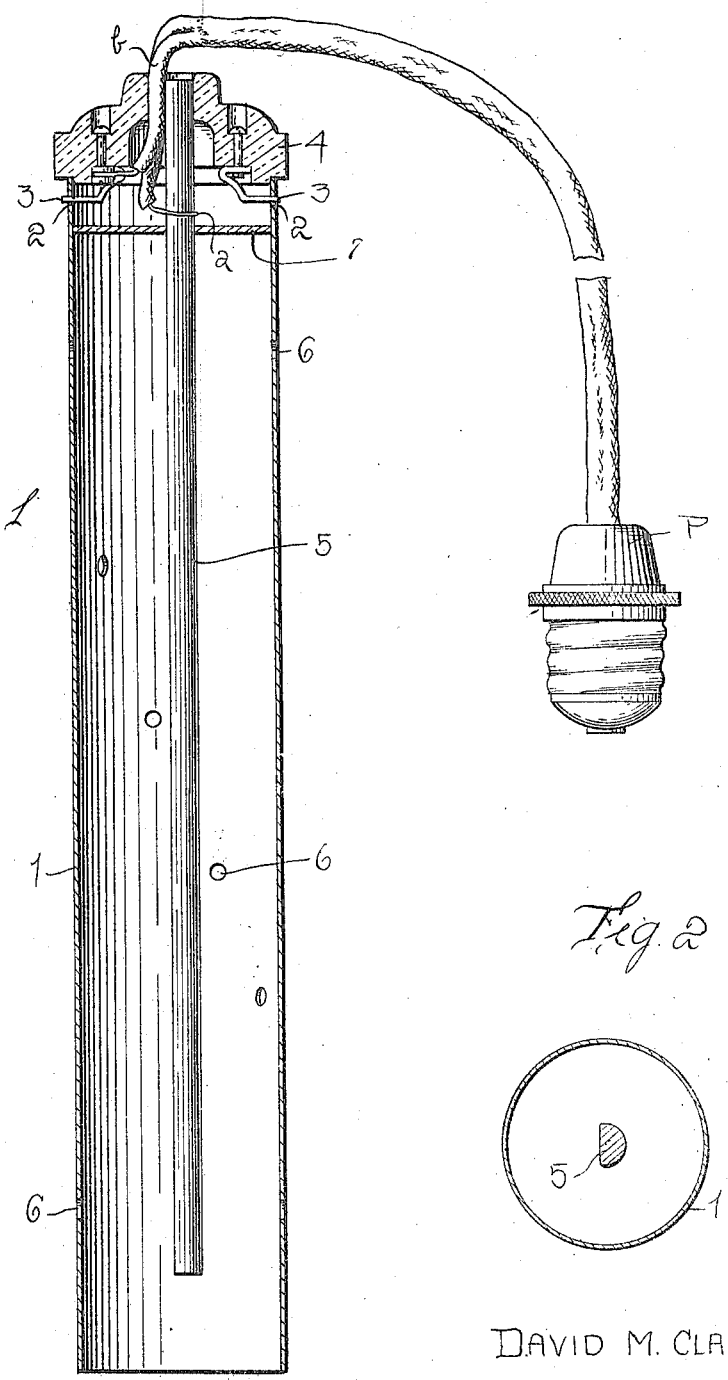

D. M. CLARK.
ELECTRIC OXIDIZER.
APPLICATION FILED AUG. 20, 1917.

1,249,597.

Patented Dec. 11, 1917.

Inventor
DAVID M. CLARK
By Watson E. Coleman
Attorney

UNITED STATES PATENT OFFICE.

DAVID M. CLARK, OF PHOENIX, ARIZONA.

ELECTRIC OXIDIZER.

1,249,597.

Specification of Letters Patent.

Patented Dec. 11, 1917.

Application filed August 20, 1917. Serial No. 187,282.

*To all whom it may concern:*

Be it known that I, DAVID M. CLARK, a citizen of the United States, residing at Phoenix, in the county of Maricopa and State of Arizona, have invented certain new and useful Improvements in Electric Oxidizers, of which the following is a specification, reference being had to the accompanying drawings.

This invention relates to certain improvements in electric oxidizers and it is an object of the invention to provide a device of this general character having novel and improved means whereby the same serves to purify water when immersed therein.

It is also an object of the invention to provide a novel and improved device of this general character comprising two electrodes in communication with a source of electrical energy and wherein one of said electrodes comprises a perforate tubular member and wherein the second electrode is positioned within the tubular member so that the water to be purified closes the circuit between the electrodes when the device is immersed.

The invention consists in the details of construction and in the combination and arrangement of the several parts of my improved electric oxidizer wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein, Figure 1 is a view partly in elevation and partly in section of an electric oxidizer constructed in accordance with an embodiment of my invention; and Fig. 2 is a transverse sectional view taken through the lower end portion of the device as illustrated in Fig. 1.

As disclosed in the accompanying drawings 1 denotes an elongated tubular member of electrical conducting material and preferably tin. The opposite ends of the member 1 are opened and the upper end portion thereof is provided with diametrically opposed openings or slots 2 to receive the clip 3 carried by the inner face of the cap member 4. The clips 3 are of electrical conducting substance and preferably brass while the cap 4 is of porcelain or other non-conducting material.

Engaged with the central portion of the cap 4 is an electrode 5 formed preferably of aluminum and which is semicircular in cross section. The electrode 5 is of a length to terminate in close proximity to the end of the member 1 remote from the cap 4. The portion of the electrode 5 adjacent the cap 4 has engaged therewith an electrical conductor $a$ leading from a suitable source of electrical energy and one of the clips 3 has engaged therewith a second conductor $b$ also leading from the source of electrical energy.

The member 1 is provided with a series of restricted openings 6 at predetermined points longitudinally thereof, said openings being offset one relative to the other.

When my device is immersed within the water to be purified the water closes the circuit between the electrode 5 and the member 1 and which results in a precipitating of the impurities within the water.

It is also to be understood that the water to be purified is contained within a suitable receptacle. It is also preferred that the conductors $a$ and $b$ be assembled in a conventional manner and have their outer extremities properly connected. The plug P is adapted to be engaged in a well known manner with the conventional socket.

Intersecting the tubular member 1 adjacent the upper end thereof is the fiber insulation 7 which affords an additional support for the electrode 5 and which also prevents water from coming in contact with the inner faces of the cap member 4 which would otherwise materially interfere with the operation of the device as the conductors $a$ and $b$ are arranged above the partition.

From the foregoing description, it is thought to be obvious that an electric oxidizer constructed in accordance with my invention is particularly well adapted for use by reason of the convenience and facility with which it may be assembled and operated and it will also be obvious that my invention is susceptible of some change and modification without materially departing from the principle and spirit thereof and for this reason I do not wish to be understood as limiting myself to the precise arrangement and formation of the several parts herein shown in carrying out my invention in practice except as hereinafter claimed.

I claim:

A device of the character described comprising a tubular member of electrical conducting material, a cap of non-conducting material closing one end of the member, the opposite end of the member being open, an electrode secured at one end to the cap and extending through a tubular member substantially the entire length thereof, means for connecting the adjacent end portions of the tubular member and the electrode with a source of electrical energy, and a partition intersecting the tubular member adjacent the cap, the electrical connections with the tubular member and electrode being intermediate the cap and the partition.

In testimony whereof I hereunto affix my signature in the presence of two witnesses.

DAVID M. CLARK.

Witnesses:
C. D. JAMISON,
J. M. CREIGHTON.

Copies of this patent may be obtained for five cents each, by addressing the "Commissioner of Patents, Washington, D. C."